Nov. 10, 1942.   F. E. FLADER   2,301,903
VIBRATIONLESS AIRCRAFT SEAT
Filed Sept. 14, 1939   2 Sheets-Sheet 1
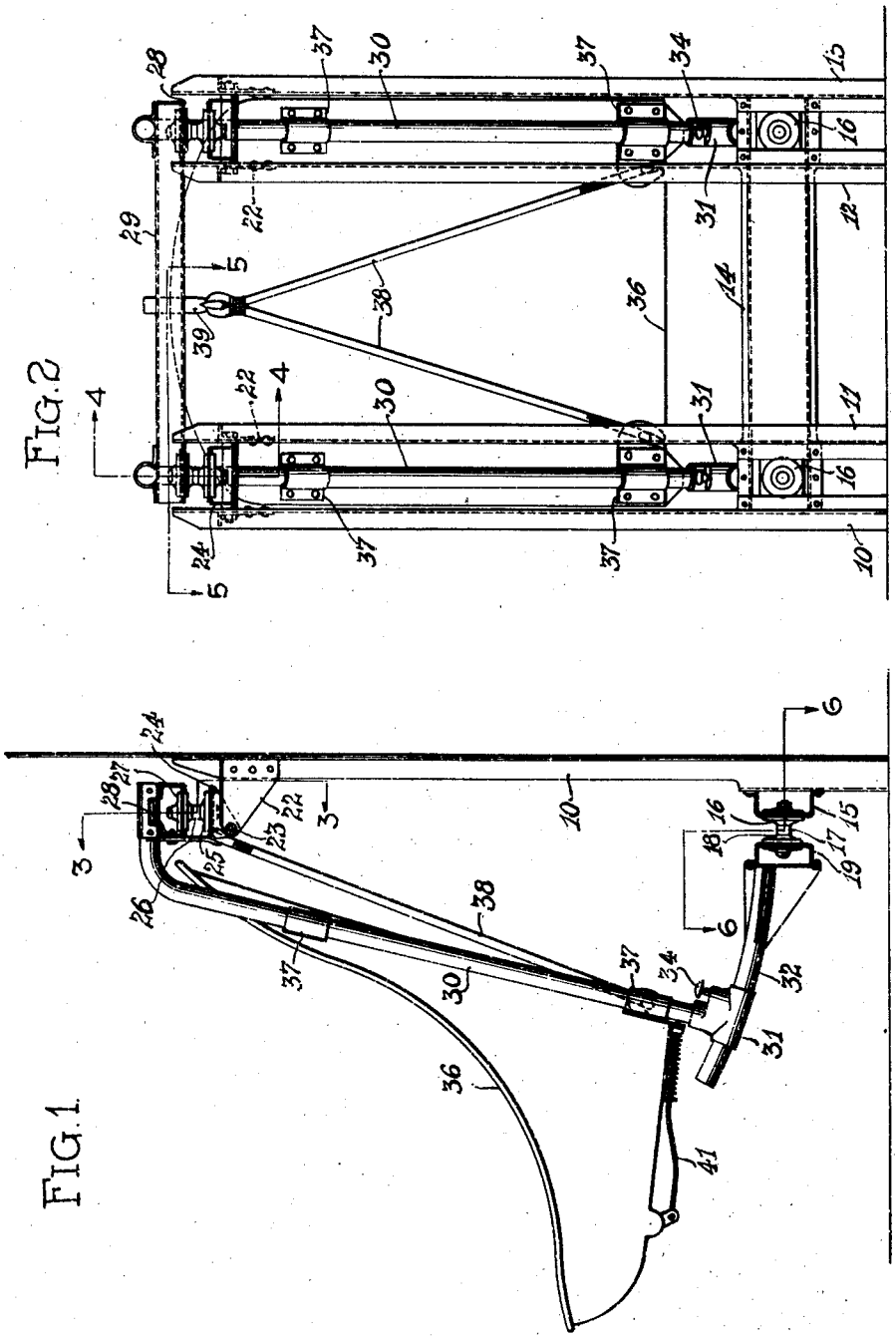
INVENTOR
FREDRIC E. FLADER.
BY
ATTORNEY Nov. 10, 1942.   F. E. FLADER   2,301,903
VIBRATIONLESS AIRCRAFT SEAT
Filed Sept. 14, 1939   2 Sheets-Sheet 2
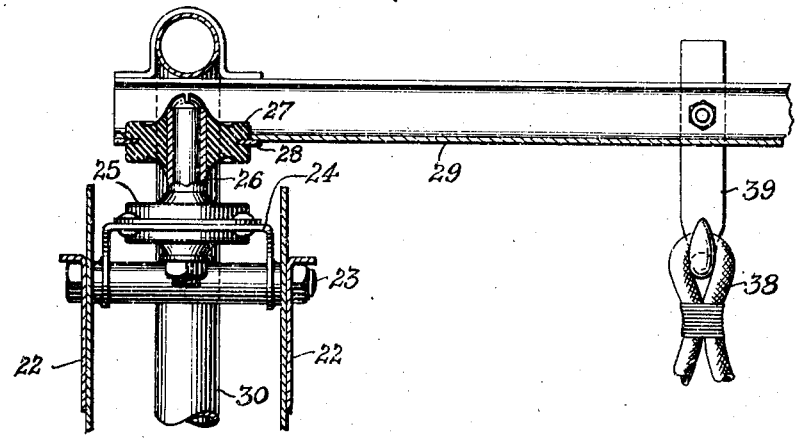
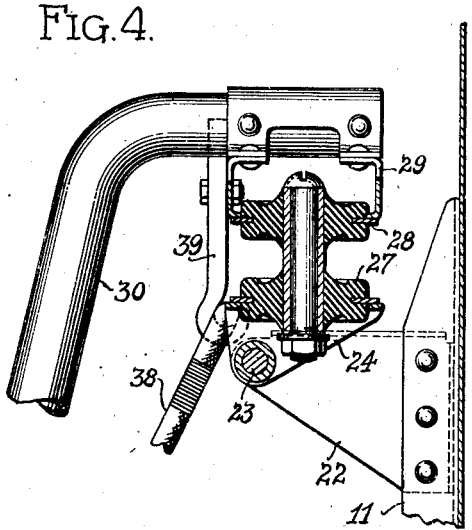
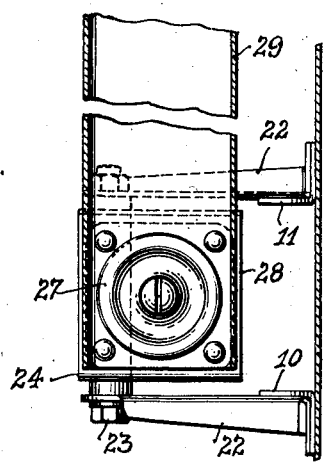
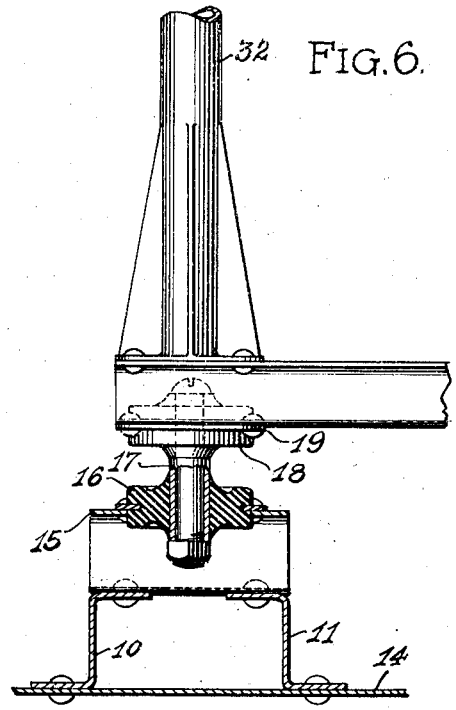
INVENTOR
FREDRIC E. FLADER.
BY
ATTORNEY Patented Nov. 10, 1942

2,301,903

UNITED STATES PATENT OFFICE 2,301,903

VIBRATIONLESS AIRCRAFT SEAT

Fredric E. Flader, Kenmore, N. Y., assignor to Curtiss-Wright Corporation, a corporation of Delaware Application September 14, 1939, Serial No. 294,822

4 Claims. (Cl. 155—5)

This invention relates to aircraft furniture, being particularly concerned with a novel form of seat mounting by which the seat is insulated by resilient devices to prevent vibration transmission thereto and by which the seat is adjustable as to height and angle.

Objects of the invention include the application of vibration insulating means to an entire seat structure along with specific means for applying and mounting the seat and insulating means, and the provision of adjustment means particularly appropriate to aircraft pilot seats.

Further objects will be indicated in the following detailed description when read in connection with the drawings, in which:

Fig. 1 is a side elevation of a seat and support;

Fig. 2 is a rear elevation;

Fig. 3 is an enlarged section on the line 3—3 of Fig. 1;

Figs. 4 and 5 are enlarged sections on the lines 4—4 and 5—5 of Fig. 2, and

Fig. 6 is an enlarged section on the line 6—6 of Fig. 1.

In Figs. 1 and 2 the general organization of the invention is shown in which rigid, substantially coplanar supports 10, 11, 12 and 13, comprising angle members, rise from the floor, these being cross braced by a member 14 secured thereto near the floor. To the member 14, between supports 10, 11 and 12, 13, fittings 15 are secured, these embracing rubber bushings 16 preferably vulcanized thereto. The bushings embrace sleeves 17 on which coaxial bushings 18 are vulcanized, the latter bushings being embraced by fittings 19.

At the tops of pairs of supports 10, 11, and 12, 13, brackets 22 are secured providing coaxial pivoted supports at 23 for fittings 24 which, like the fittings at the lower end of the supports, embrace rubber bushings 25 in turn embracing sleeves 26 on which coaxial rubber bushings 27 are vulcanized. the latter being embraced by fittings 28. Fittings 28 are joined by a rigid cross bar 29 to which a seat frame is secured, the frame comprising similar side members 30 provided at their bottom ends with fittings 31 slidable over arcuate rails 32 secured to the lower fittings 19. The fittings 31 are provided with lock plungers 34 engageable with suitable openings in the rails 32 whereby the tilt of the frame members 30 may be adjusted, by swinging about the pivots 23 between the brackets 22 and the fittings 24, the rails 32 being concentric with said pivots.

A bucket seat 36 carries spaced eyes 37 on each side which are slidable along the frame members 30, an elastic cord 38 being secured to the seat bottom and looping over a hook 39 on the cross bar 29 to support the weight of the seat and, in part, the weight of a seat occupant. The seat is further provided with slidable lock pins 41 on each side engageable with openings on the front side of the side members 30. The seat may be raised or lowered by unlocking the pins 41 and reengaging them within other appropriate openings.

The rubber bushing units shown are commercially available devices and form a convenient and effective vibration insulating device. However, other resilient devices may be used, one of the requirements being, however, that they have full elastic freedom along three right angled axes in order to insulate both dominant and stray vibration impulses and couples acting in any direction. The orientations of the rubber bushings may be varied from those shown.

The seat mounting shown is not to be confused with sprung upholstery of great resilience, which upholstery may be embodied in the seat for the occupant's comfort. Nor is the invention comparable to shock absorbers having only a single line of action. Rather, the resilient seat support allows of only limited elastic movement of the seat relative to the support in any direction for the purpose of insulating high frequency vibration in the support from the seat.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A vibration insulating adjustable seat assembly comprising a support, a seat frame pivoted at its upper end to said support, the pivot connection including an elastic vibration insulating unit, an arcuate arm substantially concentric with the frame pivot secured to said support through elastic vibration insulating units, means at the lower end of the frame engaged with and adjustable along said arm as the frame is swung about said pivot, a device for securing the frame to the arm, and a seat having brackets engaging the frame said brackets being adjustable up and down on said frame for establishing different effective heights for said seat, said seat in any position of height or tilt being insulated from said support through said elastic vibration insulating units.

2. A vibration insulating adjustable seat assembly comprising a substantially vertical support, brackets quadrangularly arranged thereon, the upper two of which are pivoted to the support, elastic bushing units each comprising an attachment element secured to one bracket, a second attachment element, and elastic material secured to and connecting said elements; an inverted U-shaped seat frame secured adjacent its upper corners to the second elements of the upper units, an arm secured to the second element of each of the lower units, means on the lower end of each limb of the frame engaging one of said arms for adjustment therealong, whereby the frame may be tiltably adjusted, and a seat having clips slidably engaging the limbs of the frame, the seat being adjustable up and down said frame, and means to secure the seat in any position of up and down adjustment on said frame.

3. A vibration insulating seat assembly comprising a rigid support, a seat frame, connectors secured to the upper end of the frame and pivoted to the support, an arm engaged with and securable to the seat frame in adjustable relation for controlling tilt of the frame, a connector securing said arm to said support, each of said several connectors comprising an elastic element of rubber or the like insulating the seat frame and seat from vibration with the support, and a seat adjustably secured to and movable up and down along said frame.

4. A vibration insulating seat assembly comprising a support, a substantially upright member having a vibration insulating pivotal connection at its upper end with said support, a substantially horizontal arm having a vibration insulating pivotal connection between the support and one end thereof, means securing a lower portion of said member to any one of several points along said arm, a seat, and means to secure said seat to said member in any one of several substantially vertical positions therealong.

FREDRIC E. FLADER.